UNITED STATES PATENT OFFICE.

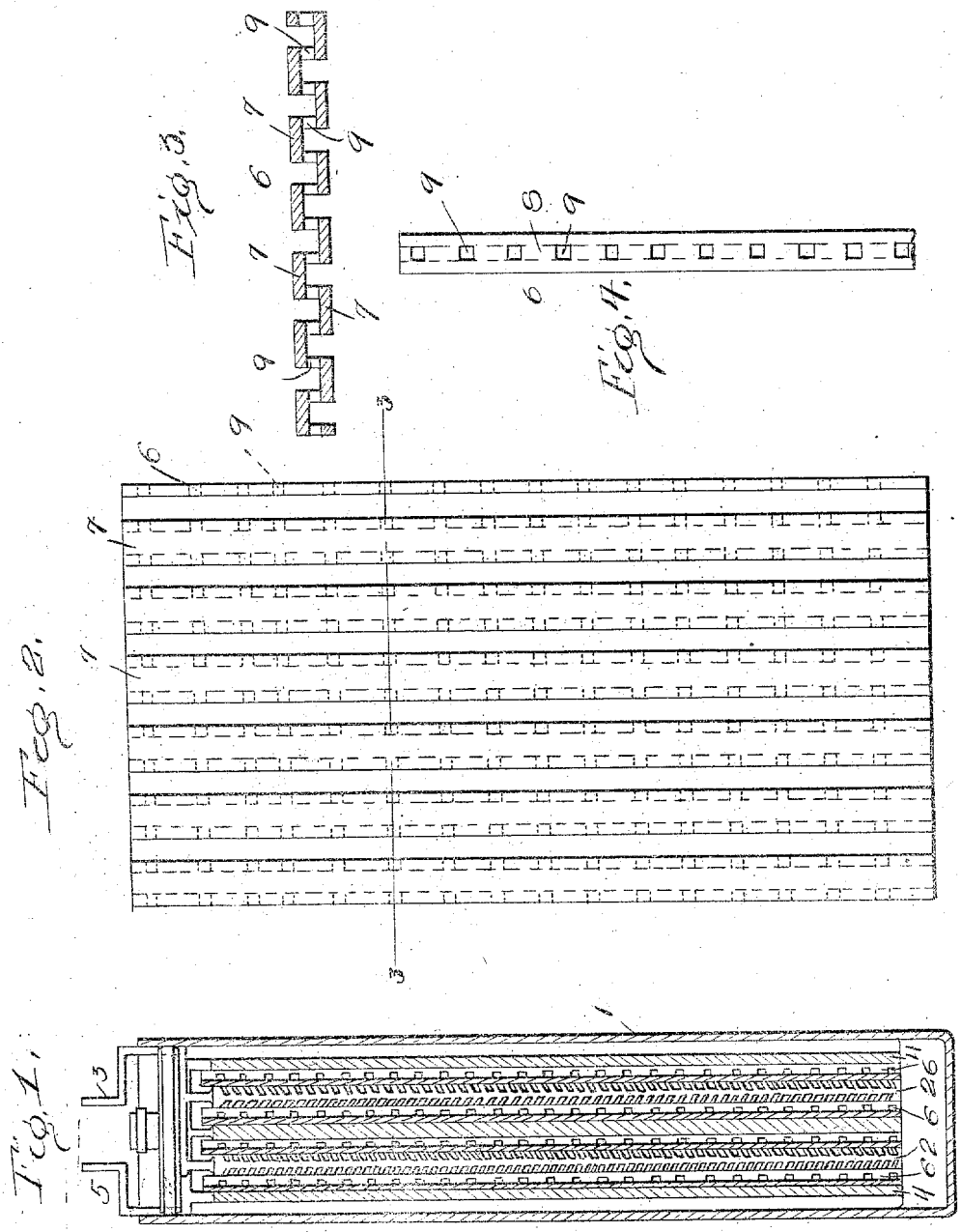

FRANK L. SESSIONS, OF COLUMBUS, OHIO, ASSIGNOR TO THE JEFFREY MANUFACTURING COMPANY, A CORPORATION OF OHIO.

SEPARATOR FOR STORAGE-BATTERY PLATES.

990,069.

Specification of Letters Patent.   Patented Apr. 18, 1911.

Application filed October 8, 1909. Serial No. 521,701.

*To all whom it may concern:*

Be it known that I, FRANK L. SESSIONS, a citizen of the United States, residing at Columbus, in the county of Franklin and State of Ohio, have invented certain new and useful Improvements in Separators for Storage-Battery Plates, of which the following is a specification, reference being had therein to the accompanying drawing.

This invention relates to separators for storage battery plates.

The object of the invention is to provide a separator which will more perfectly insulate the plates one from another, and, at the same time, allow perfect freedom of communication to permit the movement of the ions from one plate to the other.

Separators embodying my invention are specially adapted for batteries of the lead type. I have found that during the operation of batteries of this type, fine needle-like crystals of metallic lead form on the negative plates, and that when separators having perpendicular apertures are used, some of these needles will grow through the apertures until they touch the positive plates thus forming a short circuit. By my present invention I provide a separator which has no perpendicular apertures, and which, therefore, prevents all short circuiting by means of these needle-like crystals.

In the accompanying drawings I have shown a separator embodying my invention, and for purposes of illustration, I have shown a battery with the separators in place. I desire it to be understood, however, that I do not limit myself to the exact form of battery which I have shown, or to the exact form of separator. Various changes in structural details may be made within the scope of my invention.

In the drawings—Figure 1 is a cross sectional view of a storage battery having separators embodying my invention. Fig. 2 is a side elevation of a separator. Fig. 3 is a cross sectional view along the line 3—3 of Fig. 2, and Fig. 4 is a fragmentary edge elevation.

Referring to the drawings, 1 represents the storage battery jar which may be of any suitable material such as hard rubber, or glass.

2, 2 represent the positive plates of the battery, and they may be formed of lead, and the interstices thereof filled with any suitable active material. The positive plates 2, 2 are connected to the terminal 3.

4—4 are the negative plates which may be also formed of lead. These are connected to the terminal 5. Between each positive and negative plate is located a separator 6, to be hereafter fully described. The jar is filled with a suitable electrolyte which surrounds the plates and establishes electrical connection between them.

The separator comprises two series of parallel, vertical, equally spaced strips 7, the strips of each series being in the same plane with one another and parallel to the plane of the other series. The strips of the two series are off-set relative to one another and overlap as shown in Fig. 3. Between th overlapping portions of the strips are formed connecting portions 8. These connecting portions are separated from one another to form the horizontal apertures 9. It will be seen that by this construction, I have provided communication between the two sides of the separator, but have provided no perpendicular opening from one side to the other, and have, therefore, made it impossible for any crystalline growth, such as above described, to form a short circuit between the plates.

The separator may be built up of separate parts, as above described, if desired, or it may be formed in one integral piece. I prefer to form the separator of wood, but any other usual or preferred material, such as hard rubber, may be used.

What I claim is—

1. A separator for storage battery plates having openings in one surface thereof, openings in the other surface thereof, and connecting passageways between said openings, each of the said passageways connecting only openings which are staggered relative to the main plane of the separator, substantially as set forth.

2. A separator for storage battery plates having passageways extending therethrough, all parts of the ends of each of said passageways being offset relative to each other in a direction parallel to the main plane of the separator, substantially as set forth.

3. A separator for storage battery plates having passageways extending therethrough, all parts of one end of each of said passageways lying in a different perpendicular plane from any part of the other end of the passageway, substantially as set forth.

4. A separator for storage battery plates, comprising a series of parallel flat strips with openings between, a second series of similar parallel flat strips lying in a plane parallel to that of the first series and separated therefrom, the strips of one series overlapping those of the other, and connections between the overlapping portions of said strips, substantially as set forth.

5. A separator for storage battery plates having apertures extending therethrough, each of said apertures comprising a plurality of distinct portions at angles one to another and all parts of each end of each aperture being offset relative to all parts of the other end, substantially as set forth.

6. A separator for storage battery plates having on each side a series of parallel grooves, the grooves of one side being alternately disposed relative to those of the other side and connecting apertures between the grooves parallel to the main plane of the separator, substantially as set forth.

7. A separator for storage battery plates having on each side a series of parallel perpendicular-sided grooves, the grooves on one side being alternately disposed relative to those of the other side and connecting apertures between the grooves, substantially as set forth.

8. A separator for storage battery plates having depressions on each side, each of the said depressions being rectangular in cross section and those of one side being alternately disposed relative to those of the other side, and connecting apertures between the depressions of the two sides, substantially as set forth.

In testimony whereof I affix my signature, in presence of two witnesses.

FRANK L. SESSIONS.

Witnesses:
E. P. SNIVELY,
DUDLEY T. FISHER.

---

Correction in Letters Patent No. 990,069.

It is hereby certified that in Letters Patent No. 990,069, granted April 18, 1911, upon the application of Frank L. Sessions, of Columbus, Ohio, for an improvement in "Separators for Storage-Battery Plates," an error appears in the printed specification requiring correction as follows: Page 1, line 19, the word "lea " should read *lead-lead;* and that the said Letters Patent should be read with this correction therein that the same may conform to the record of the case in the Patent Office.

Signed and sealed this 23d day of May, A. D., 1911.

[SEAL.]

C. C. BILLINGS,
*Acting Commissioner of Patents.* plane from any part of the other end of the passageway, substantially as set forth.

4. A separator for storage battery plates, comprising a series of parallel flat strips with openings between, a second series of similar parallel flat strips lying in a plane parallel to that of the first series and separated therefrom, the strips of one series overlapping those of the other, and connections between the overlapping portions of said strips, substantially as set forth.

5. A separator for storage battery plates having apertures extending therethrough, each of said apertures comprising a plurality of distinct portions at angles one to another and all parts of each end of each aperture being offset relative to all parts of the other end, substantially as set forth.

6. A separator for storage battery plates having on each side a series of parallel grooves, the grooves of one side being alternately disposed relative to those of the other side and connecting apertures between the grooves parallel to the main plane of the separator, substantially as set forth.

7. A separator for storage battery plates having on each side a series of parallel perpendicular-sided grooves, the grooves on one side being alternately disposed relative to those of the other side and connecting apertures between the grooves, substantially as set forth.

8. A separator for storage battery plates having depressions on each side, each of the said depressions being rectangular in cross section and those of one side being alternately disposed relative to those of the other side, and connecting apertures between the depressions of the two sides, substantially as set forth.

In testimony whereof I affix my signature, in presence of two witnesses.

FRANK L. SESSIONS.

Witnesses:
 E. P. SNIVELY,
 DUDLEY T. FISHER.

---

Correction in Letters Patent No. 990,069.

It is hereby certified that in Letters Patent No. 990,069, granted April 18, 1911, upon the application of Frank L. Sessions, of Columbus, Ohio, for an improvement in "Separators for Storage-Battery Plates," an error appears in the printed specification requiring correction as follows: Page 1, line 19, the word "lea " should read *lead-lead;* and that the said Letters Patent should be read with this correction therein that the same may conform to the record of the case in the Patent Office.

Signed and sealed this 23d day of May, A. D., 1911.

[SEAL.]

C. C. BILLINGS,
*Acting Commissioner of Patents.*

Correction in Letters Patent No. 990,069

It is hereby certified that in Letters Patent No. 990,069, granted April 18, 1911, upon the application of Frank L. Sessions, of Columbus, Ohio, for an improvement in "Separators for Storage-Battery Plates," an error appears in the printed specification requiring correction as follows: Page 1, line 19, the word "lea" should read *lead-lead;* and that the said Letters Patent should be read with this correction therein that the same may conform to the record of the case in the Patent Office.

Signed and sealed this 23d day of May, A. D., 1911.

[SEAL.]

C. C. BILLINGS,
*Acting Commissioner of Patents.*